(12) United States Patent
Horoba et al.

(10) Patent No.: US 11,550,342 B2
(45) Date of Patent: Jan. 10, 2023

(54) GAS SEPARATOR AND APPARATUS FOR MEASURING FLOW OF ONE OR MORE COMPONENTS OF A MULTIPHASE MEDIUM, ESPECIALLY A NATURAL GAS-WATER MIXTURE

(71) Applicant: Endress+Hauser Flowtec AG, Reinach (CH)

(72) Inventors: Guido Horoba, Gottenheim (DE); Helmut Zeislmeier, Freising (DE); Wolfgang Drahm, Erding (DE); Rainer Höcker, Waldshut (DE)

(73) Assignee: Endress+Hauser Flowtec AG, Reinach (CH)

( * ) Notice: Subject to any disclaimer, the term of this patent is extended or adjusted under 35 U.S.C. 154(b) by 979 days.

(21) Appl. No.: 16/331,250

(22) PCT Filed: Aug. 23, 2017

(86) PCT No.: PCT/EP2017/071222
§ 371 (c)(1),
(2) Date: Mar. 7, 2019

(87) PCT Pub. No.: WO2018/046299
PCT Pub. Date: Mar. 15, 2018

(65) Prior Publication Data
US 2019/0196518 A1    Jun. 27, 2019

(30) Foreign Application Priority Data
Sep. 9, 2016 (DE) .................... 10 2016 116 989.7

(51) Int. Cl.
*B01D 19/00* (2006.01)
*G05D 7/06* (2006.01)
(Continued)

(52) U.S. Cl.
CPC ....... *G05D 7/0635* (2013.01); *B01D 19/0042* (2013.01); *B01D 19/0063* (2013.01);
(Continued)

(58) Field of Classification Search
CPC .............. G05D 7/0635; B01D 19/0042; B01D 19/0063; B01D 19/00; G01F 1/20;
(Continued)

(56) References Cited

U.S. PATENT DOCUMENTS 2,610,697 A    9/1952  Lovelady et al.
2,774,441 A *  12/1956 Buurman ............... D01D 1/103
                                                            96/194
(Continued)

FOREIGN PATENT DOCUMENTS

AU    2017324747 B2    3/2018
DE       7907208 U1    7/1979
(Continued)

OTHER PUBLICATIONS

Search Report for German Patent Application No. 10 2016 116 989.7, German Patent Office, dated Apr. 12, 2017, 7 pp.
(Continued)

*Primary Examiner* — Minh Q Le
(74) *Attorney, Agent, or Firm* — Kelly J. Smith; Endress+Hauser (USA) Holding Inc.

(57) ABSTRACT

A gas separator for separating a multiphase medium containing a gas and a liquid includes a tubular basic unit having a longitudinal axis, an intake for a gaseous medium, a liquid outlet and a gas outlet. The tubular basic unit has an intake region and a discharge region. The gas separator includes, between the intake region and the discharge region, a weir having a guiding surface, over which the medium can flow to form a shallow water region. The gas contained in the medium can escape from the medium in the shallow water (Continued)

region and be led away from the gas separator through the gas outlet. The disclosure is also directed to an apparatus for registering flow of at least one component of a multiphase medium.

15 Claims, 3 Drawing Sheets

(51) Int. Cl.
| | |
|---|---|
| *G01F 15/08* | (2006.01) |
| *G01F 1/20* | (2006.01) |
| *G01F 1/58* | (2006.01) |
| *G01F 1/66* | (2022.01) |
| *G01F 1/68* | (2006.01) |
| *G01F 1/74* | (2006.01) |

(52) U.S. Cl.
CPC ............... *G01F 1/20* (2013.01); *G01F 1/58* (2013.01); *G01F 1/66* (2013.01); *G01F 1/68* (2013.01); *G01F 15/08* (2013.01); *G01F 1/74* (2013.01)

(58) Field of Classification Search
CPC ..... G01F 1/58; G01F 1/66; G01F 1/68; G01F 1/74; G01F 15/08
USPC .......................................................... 96/183
See application file for complete search history.

(56) References Cited

U.S. PATENT DOCUMENTS

| | | | |
|---|---|---|---|
| 3,044,236 A | 7/1960 | Bearden et al. | |
| 5,127,272 A * | 7/1992 | Dean .......................... | G01F 1/86 73/861.04 |
| 5,232,475 A * | 8/1993 | Jepson ................ | B01D 19/0031 96/204 |
| 5,507,858 A * | 4/1996 | Jepson ................ | B01D 19/0042 96/206 |
| 6,053,039 A * | 4/2000 | Karvinen ................ | G01F 15/08 73/149 |
| 6,318,156 B1 | 11/2001 | Dutton et al. | |
| 6,537,458 B1 | 3/2003 | Polderman | |
| 6,730,146 B2 | 5/2004 | Shah | |
| 9,664,548 B2 * | 5/2017 | Henry ........................ | G01F 1/74 |
| 2004/0004170 A1 | 1/2004 | Oddsen, Jr. | |
| 2004/0044170 A1 | 3/2004 | DeBruin | |
| 2006/0137663 A1 * | 6/2006 | Vaught ............... | B01D 19/0042 96/220 |
| 2013/0228075 A1 * | 9/2013 | Zylla ................ | B01D 19/0042 95/260 |
| 2014/0299210 A1 * | 10/2014 | Atherton ................ | G01F 1/74 137/624.27 |
| 2018/0045224 A1 * | 2/2018 | Alban ..................... | F04D 17/10 |
| 2019/0196518 A1 | 6/2019 | Horoba et al. | |

FOREIGN PATENT DOCUMENTS

| | | |
|---|---|---|
| DE | 19781704 B4 | 3/1993 |
| DE | 19781704 B4 | 3/1999 |
| DE | 19781704 B4 | 1/2007 |
| EP | 3510365 A1 | 7/2019 |
| JP | 2006343064 | 12/2006 |
| JP | 2006343064 A | 12/2006 |
| WO | 2007008626 A1 | 1/2007 |

OTHER PUBLICATIONS

International Search Report for Patent Application No. PCT/EP2017/071222, WIPO, dated Nov. 29, 2017, 14 pp.
Urea Production Process, Feb. 28, 1978, Urea Workshop of Natural Gas Chemical Plant at Luzhou Petrochemical Industry Press.
Training Materials for All-around People on Duty at 600 MW Thermal Units, Apr. 30, 2007, Yunhua Zhang et al. China Electric Power Pess.

* cited by examiner

GAS SEPARATOR AND APPARATUS FOR MEASURING FLOW OF ONE OR MORE COMPONENTS OF A MULTIPHASE MEDIUM, ESPECIALLY A NATURAL GAS-WATER MIXTURE

CROSS-REFERENCE TO RELATED APPLICATIONS

The present application is related to and claims the priority benefit of German Patent Application No. 10 2016 116 989.7, filed on Sep. 9, 2016 and International Patent Application No. PCT/EP2017/071222 filed on Aug. 23, 2017, the entire contents of which are incorporated herein by reference.

TECHNICAL FIELD

The present invention relates to a gas separator as defined in the preamble of claim 1 and to an apparatus for measuring flow of one or more components of a multiphase medium, as well as to a preferred use of this apparatus.

BACKGROUND

Flow measurement of two-phase flows in pipelines. Flow measuring devices are, in general, designed for measuring single phase fluids. When the fluid to be measured is two-phase (droplets in a gas or bubbles in a liquid), this leads to an increased measurement uncertainty or makes measurement completely impossible.

Fundamentally, separators, e.g. gas separators, are known from the state of the art, especially U.S. Pat. Nos. 6,620,221 B1, 5,507,858 A, 3,960,525 A, for the removal of gas from gas-liquid media. In such case, various structural solutions, for example, perforated plates and the like, are applied.

SUMMARY

An object of the invention is to provide a gas separator, which enables treatment of a flow containing gas bubbles in an especially efficient manner. A special object is, additionally, to enable a measuring of at least one component of this multiphase medium.

The present invention achieves these objects by a gas separator as defined in claim 1 and by its use in an apparatus as defined in claim 11.

A gas separator of the invention for separating a multiphase medium containing a gas, especially in the form of gas bubbles, and a liquid, comprises a tubular basic unit having a longitudinal axis, as well as an intake for a gas containing medium, a liquid outlet and a gas outlet.

The tubular basic unit includes an intake region and a discharge region.

The gas separator includes between the intake region and the discharge region a weir having a guiding surface, over which the medium can flow to form a shallow water region, wherein the weir, especially the guiding surface, is embodied in such a manner that the gas contained in the medium can escape from the medium in the shallow water region and be led away from the gas separator through the gas outlet.

The weir can be provided, for example, by a formed body, which is arranged in the interior of the tubular basic unit.

In an additional preferred embodiment of a number of different embodiments, the weir can be provided by a preformed sheet arranged in the interior of the tubular basic unit. The sheet and the basic unit form, in this case, a hollow space.

Advantageous embodiments of the invention are subject matter of the dependent claims.

The weir can advantageously have a height, which amounts to between 60% and 120% of the perpendicular distance from the longitudinal axis to the bottom wall of the tubular basic unit.

A portion of the weir can be embodied as a ramp, which extends and falls from the guiding surface in the direction of the discharge region. This ramp can preferably have a slope between 15 and 45 degree. It prevents the formation of vortices by flow shedding.

The dimension in the lengthwise extension of the guiding surface of the weir is preferably greater than the average diameter of the tubular basic unit.

The gas separator can have between the gas outlet and the tubular basic unit a gas drain tube, which has a funnel-shaped cross sectional narrowing. The greater intake region of the gas drain tube serves for removal of liquid fractions from the gas.

The gas drain tube can have for this, especially advantageously, a portion with an average diameter of at least 75% of the average diameter of the tubular basic unit, preferably with an average diameter of no more than a nominal diameter jump, compared with the average diameter of the tubular basic unit.

Arranged in the discharge region of the basic unit can be a drain tube for draining the liquid, especially the bubble free liquid, wherein in the discharge region and/or in the drain tube a vortex breaker is arranged for preventing bubble entrainment into the liquid.

An imaginary cutting plane along the longitudinal axis divides the gas separator into a top part and a bottom part. An intake tube for supplying the medium into the tubular basic unit and the drain tube for draining the liquid, especially the bubble free liquid, from the tubular basic unit, are, in such case, advantageously arranged on the bottom part of the tubular basic unit. The gas drain tube is preferably arranged on the top part of the tubular basic unit.

In order to remove even small gas bubbles from the medium, the intake tube can advantageously be embodied as a riser tube.

According to the invention, an apparatus for registering flow of at least one component of a multiphase medium containing at least one gas, especially in the form of gas bubbles, and a liquid, includes the gas separator of the invention, wherein at least one flow measuring device for registering the flow of the gas and/or the liquid is arranged fluid mechanically in the direction of the gas flow or the liquid flow behind the tubular basic unit.

Advantageous embodiments of the invention are subject matter of the dependent claims.

Advantageously arranged on the or in the drain tube for the liquid is a flow measuring device, or a tube with a flow measuring device, for registering the flow of the liquid, wherein the flow measuring device is preferably a magneto inductive flow measuring device, a vortex flow measuring device, a Coriolis flow measuring device or an ultrasonic, flow measuring device.

Arranged on the or in the gas drain tube is a flow measuring device or a tube with a flow measuring device for registering a gas flow, wherein the flow measuring device is preferably a thermal, flow measuring device, a vortex flow measuring device or an ultrasonic, flow measuring device.

The apparatus includes especially preferably a valve for control of the gas flow at the gas outlet of the gas separator. This can be utilized for adjusting a level in the shallow water region over the guiding surface of the weir to below a maximum limit value and, thus, to avoid too much filling of the tubular basic unit.

The apparatus preferably includes supplementally to the aforementioned valve, another valve for control of the liquid flow at the liquid outlet of the gas separator. This can be utilized for adjusting a depth in the discharge region of the tubular basic unit above a maximum limit value and so to avoid an emptying of the discharge region.

The valve for control of the gas flow at the gas outlet of the gas separator and/or the valve for control of the liquid flow at the liquid outlet of the gas separator are controllable valves, wherein serving as control variable, in each case, is a limit value for a depth in the discharge region or in the shallow water region, as the case may be. The maintaining of the depth within the predetermined limit values can be metrologically monitored, e.g. by devices for fill-level monitoring and/or -ascertainment.

An especially preferred application of the aforementioned apparatus is in the measurement of flow velocity of a multiphase natural gas-water medium, especially in natural gas drilling.

BRIEF DESCRIPTION OF THE DRAWING

The invention will now be explained in greater detail based on an example of an embodiment and with the help of the appended drawing, the figures of which show as follows.

DETAILED DESCRIPTION

Figure 1:
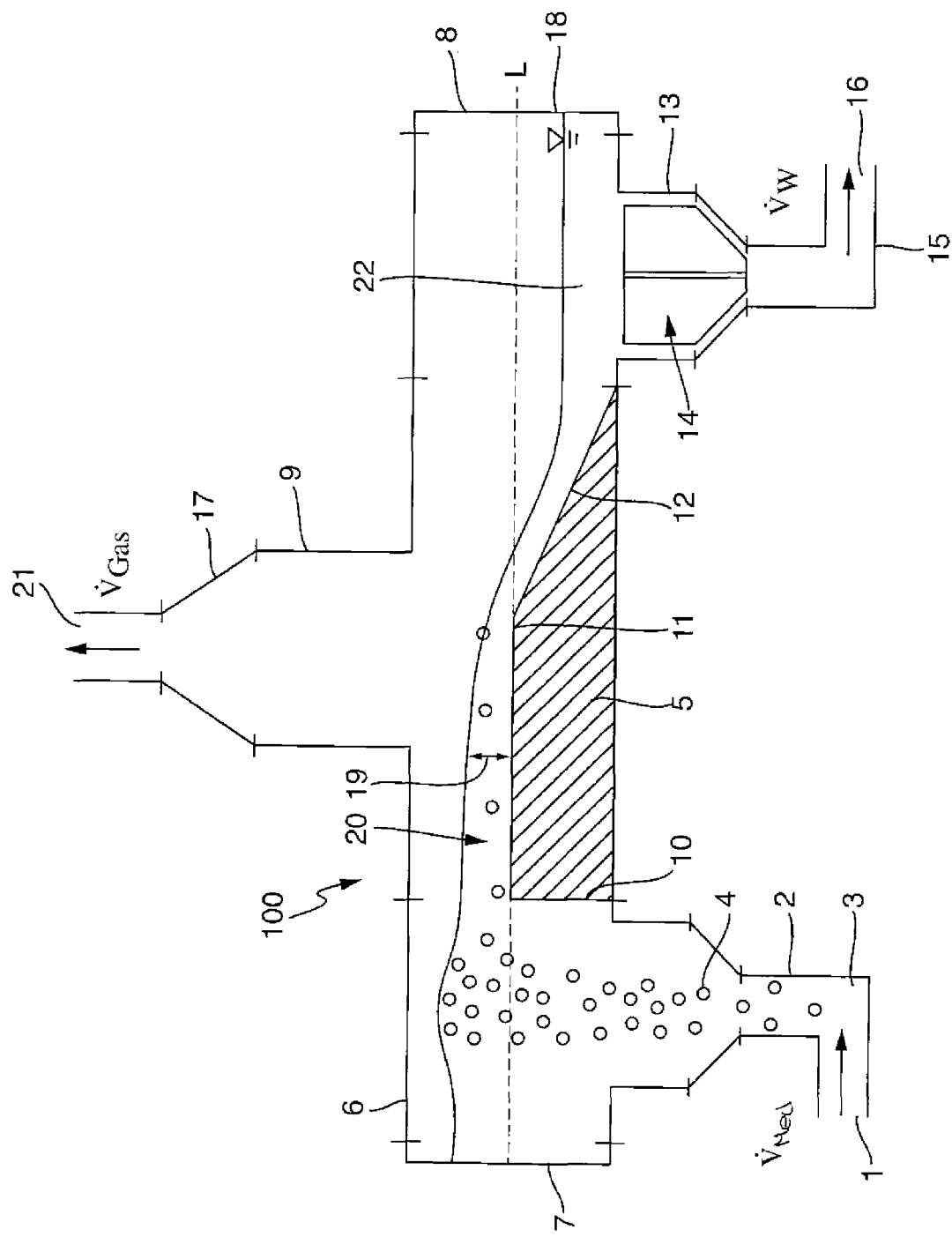
FIG. 1 shows a schematic view of a gas separator of the invention.

FIG. 1 shows a gas separator 100 of the invention. Such includes an intake 1 for a multiphase medium 3. This multiphase medium 3 includes a liquid phase and a gas phase, which is contained in the form of small gas bubbles 4 in the multiphase medium 3. These small gas bubbles 4 can in certain cases escape only with difficulty from the multiphase medium, since they are often entrained by the flow and impeded from escaping by the pressure of the liquid.

A typical example is a water-natural gas medium, which occurs in the case of drilling for natural gas or petroleum. The water is often sea water and includes up to 20 volume percent natural gas. The natural gas content, on the one hand, makes the disposal of the water problematic, while, on the other hand, the contained natural gas represents potential value.

Independently of ecological and economical points of view, the flow measurement of a liquid medium containing gas bubbles has, indeed, been basically possible for long time, however only with very expensive flow measuring devices.

Flow measurement of the individual components, thus, the liquid and the gas, can according to the present invention occur with the gas separator 100 of the invention.

The gas separator 100 includes a tubular basic unit 6, which has a longitudinal axis L, which can preferably be perpendicular to vertical or inclined relative to vertical. An imaginary plane, which contains the longitudinal axis L, divides the tubular body into a bottom part 70 and an upper part 60. The tubular basic unit 6 of FIG. 1 is closed in the end regions 7 and 8. Arranged in an intake region 40 is an intake tube 2, which is embodied in the variants of FIGS. 1 and 2 as a riser tube. Within the intake tube 2, the multiphase medium 3 is introduced into the tubular basic unit 6. In such case, the cross section of the intake tube 2 increases from the intake 1 to the interface with the tubular basic unit 6, whereby the intake velocity advantageously decreases and no fountain forms above the riser tube.

The filling of the tubular basic unit 6 occurs from the bottom part 70 of the tubular basic unit 6, thus, from the inlet 1, which is arranged below the tubular basic unit 6. In this way, a part of the gas bubbles can, due to the heightened liquid column, which is greater than the depth of the tubular basic unit 6, rise toward the surface due to the increased upwardly directed forces.

In a less preferred embodiment of the invention, it is, however, also possible that the delivery of the multiphase medium 3 occurs not via the riser tube, but, instead, that the intake tube 2 is arranged in the end region 7 of the tubular basic unit 6 located before the intake region 40 of the tubular basic unit 6.

Furthermore, the gas separator includes a discharge region 50 for the essentially bubble free liquid 27 as a component of the multiphase medium 3.

Located in the discharge region 50 is a drain tube 15 for draining the liquid 27 from the tubular basic unit 6. Drain tube 15 communicates with a liquid outlet 16. Drain tube 15 is arranged on the bottom part 70 of the tubular basic unit 6. It has a funnel form in the region of the interface with tubular basic unit 6. Arranged in the funnel 13 is a vortex breaker 14. This can comprise, for example, an element composed of two or more planar formations arranged cross shaped relative to one another. This prevents vortex formation. The lessened cross section of the discharge tube in its end region additionally assures a complete filling of the discharge tube.

Arranged between the intake and discharge regions 40 and 50 in the tubular basic unit 6, preferably along the bottom part 70 of the tubular basic unit 6, is a weir 5, which in the intended operation is flowed over by the medium 3. In contrast to having a perforated plate, in this case, the flowed over surface of the weir is closed.

Weir 5 of the gas separator of the invention is a protrusion, preferably a planar formation secured in the basic unit, e.g. a sheet metal product welded in place, or a molded or cast body, e.g. of a synthetic material (e.g. a plastic) or metal. The protrusion can preferably extend upwards from the floor of the bottom part 70 of the tubular basic unit 6. In such case, the weir 5 is preferably mirror symmetrically embodied, wherein longitudinal axis L of the tubular basic unit 6 lies in the symmetry plane of the weir 5.

The minimum distance between the edge region of the intake tube 2 to the tubular basic unit 6 and the edge region of the drain tube 15 from the tubular basic unit 6 defines a distance I.

Weir 5 extends preferably over a region of greater than 60%, preferably greater than 80%, of this distance I.

The height z of the weir 5 can be between 30% to 60% of the average diameter of the tubular basic unit 6. The average diameter is in the case of a basic unit with circular cross section the "normal" diameter. However, also basic units with polygon cross section, e.g. triangle, rectangle, hexagon etc., can be used. In such case, the average diameter is the average value of all arising diameters of cross sections perpendicular to the longitudinal axis L, thus, the average value of all distances between two points of the tube wall of the basic unit 6, whose connecting straight line extends through the longitudinal axis L.

The height z is the maximum separation between the bottom wall and the surface of the weir 5 in a cutting plane containing the longitudinal axis L. This is typically the longitudinal cross section of the tubular basic unit 6.

The basic unit 6 does not, however, absolutely have to be embodied as a round tube, but, instead, can be, for example, also a tube having a triangular cross section, rectangular cross section, hexagonal cross section or the like.

Weir 5 includes a guiding surface 11, over which the medium flows. The guiding surface can be curved, to the extent that the cross section of the tubular basic unit is at least sectionally circularly shaped in the region of the weir 5.

The guiding surface extends in a longitudinal section of the tubular basic unit 6 parallel to the longitudinal axis L of the basic unit 6.

The medium flows widely over the guiding surface 11. The function of weir 5 with the guiding surface 11 is to lessen the distance of the small gas bubbles 4 from the upper surface of the liquid, since the liquid level 19 and the flow over height over the guiding surface 11 is very small. In the flow over the weir, the path of the small gas bubbles in the liquid is minimized, whereby the gas can be allowed to leave the medium in the region over the guiding surface 11, i.e. in the shallow water region 20. The depth in the shallow water region, plus the weir height z, equals fill level should preferably be not more than ¾ of the tube diameter. Preferably, a monitoring of this maximum limit value of the fill level can be provided, e.g. with a limit switch.

Weir 5 additionally includes a ramp 12 falling in the direction of the discharge region 50. The guiding surface 11 transitions to the ramp in the direction of the discharge region 50. The ramp provides a continual lessening of the weir height down to the bottom wall of the basic unit 6 starting from the guiding surface and moving toward the discharge region 50.

Weir 5 can be embodied, for example, as appropriately bent sheet metal welded with the tube wall or as a molded or cast body, which is connected with the tube wall.

The slope of the ramp 12 of the weir 5 can preferably be in the range 15-45°. The ramp advantageously prevents a shedding of the liquid over the weir, which would lead to vortex formation and to an undesired forming of gas bubbles.

The intake region 40 includes in the intended operation a first liquid level I and the discharge region 50 a second liquid level II. The shallow water region 20 has the liquid depth 19, which leads to the third liquid level.

The liquid level II within the tubular basic unit 6 should preferably be at least 20% of the tube diameter in the discharge region 50. This prevents an emptying of the basic unit and an undesired vortex formation.

Connected to the top of the upper part 60 of the tubular basic unit 6 is a gas drain tube 9 for the gas leaving the medium 3. Gas drain tube 9 is preferably arranged at least in certain regions above the weir 5 on the top of the upper part 60 of the tubular basic unit 6.

The gas drain tube 9 includes a gas outlet 21 for the gas to leave the gas separator 100. Gas drain tube 9 has a funnel-shaped cross section 17 narrowing toward the gas outlet 21. This is advantageous, in order that entrained liquid fractions can condense on the inclined surfaces of the gas drain tube 9. Additionally, in this way, a large collection region for the gas can be formed, so that liquid fractions in the deposited gas collect in this region and can fall back into the liquid. Therefore, it is advantageous that the gas drain tube 9 at least in certain regions has an average diameter of at least 75% of the average diameter of the tubular basic unit 6, and preferably has no more than a nominal diameter jump and, thus, amounts more or less to a single nominal diameter of the diameter of the tubular basic unit 6.

The average diameter is to be applied, for example, for a rectangular tubular basic unit, in the case of which a number of diameters can occur. The average diameter is, in such case, the averaged value of all diameters arising in the tube.

In a preferred embodiment of the invention, the gas drain tube is perpendicular to the longitudinal axis L of the tubular basic unit 6.

Especially, the tubular basic unit 6 as well as also the weir 5 can be manufactured of sea water resistant steel. The gas separator can be welded to one or more pipelines or secured thereto by means of flange connection.

For monitoring the downstream, second liquid level II, optionally, a measuring system 18 can be provided for monitoring the subceeding of a minimum depth. This can preferably occur mechanically or electromechanically, for example, by a float or by a limit switch.

Figure 2:
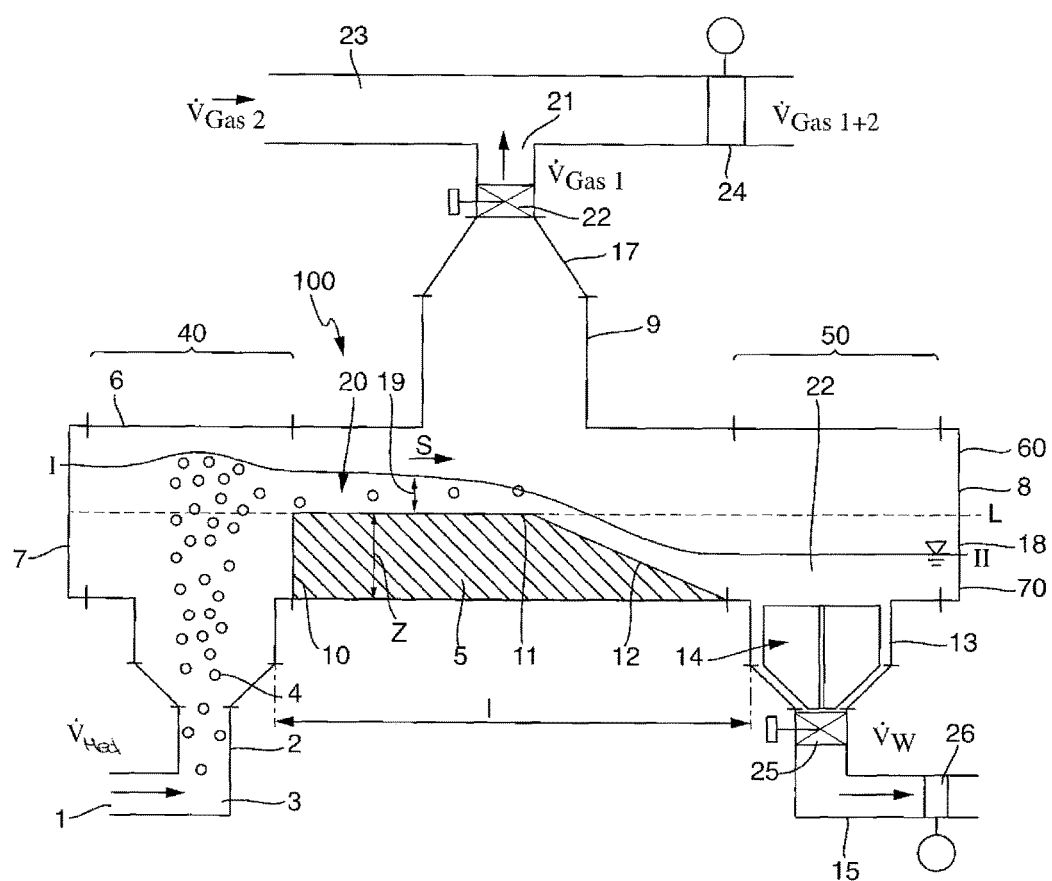
FIG. 2 shows a schematic view of an apparatus for measuring one or more components of a multiphase flow with the gas separator of the invention shown in FIG. 1.

FIG. 2 shows schematically the arrangement of the gas separator 100 in an apparatus for measuring the flow of at least one of the components of the multiphase medium 3.

Of interest, in such case, is mainly measurement of the flow, especially flow velocity, the volume- and/or the mass flow, of the liquid phase. This can, in the case of upstream gas separator, then occur without problem by flow measuring device process measurements technology 26, for example, by a magneto inductive flow measuring device, a vortex flow measuring device, an ultrasonic, flow measuring device or a Coriolis flow measuring device, which is placed fluid mechanically after the liquid outlet.

Referenced to the particular example of measurement of the water phase of a natural gas-water medium, here the volume flow $V_W$ of water can be ascertained.

Following directly on the gas outlet 21, a measuring tube 24 of flow measuring device process measurements technology can be connected for measuring flow of a gas, especially of natural gas, for example, an ultrasonic, flow measuring device, a thermal, flow measuring device or a vortex flow measuring device.

In the drilling technology, it is, however, usual to convey, besides water also simultaneously natural gas. Therefore, communicating with the gas outlet 21 of the gas separator is a gas guiding, especially natural gas conveying tube 23, in which natural gas flows with flow velocity $V_{gas\ 2}$ and to which the natural gas with flow velocity $V_{Gas\ 1}$ is added. Fluid mechanically connected behind the gas outlet 21 to the gas conveying tube 23 is the flow measuring device 24, so that the total flow of the supplied gas can be ascertained. Here of interest is not measurement of the flow of the gas fraction in the water. There can, however, be other applications, where the gas flow is the relevant measured variable.

The apparatus of FIG. 2 includes supplementally to the measurement arrangement with the two flow measuring devices 24 and 26, additionally, two valves 22 and 25, which are arranged in FIG. 2 on the or in the gas drain tube 9 and on the or in the liquid drain tube 15. These valves can, however, also be arranged in the apparatus outside of the gas separator 100.

The function of these valves will now be explained. Depending on construction, the flowing in of the medium 3 depends on the pumping power of the pump (not shown) connected in FIG. 2 in front of the apparatus. The flowing out of the liquid 27 in the discharge region 50 is rather dependent on the pressure loss, which can occur e.g. in a reservoir connected fluid mechanically after the apparatus.

Thus, it can in certain cases occur that the liquid level I and/or II undesirably increase(s). This can be resisted by closure of the valve 22. In such case, there results an increased gas pressure on the medium 3 and, thus, a compelled sinking of the liquid level I and/or II. The valve control can occur by the above described monitoring of a maximum depth in the shallow water region 20.

Furthermore, the liquid level II of the liquid 27 located fluid mechanically behind the weir 5 should not fall below a minimum value. Otherwise, the discharge region 50 would run dry and gas would get into the drain tube 15. The monitoring of this requirement can occur in mechanical or electromechanical manner, e.g. by a limit switch or a float.

Also, a pressure difference measurement or other variants of fill-level monitoring can be utilized for controlling the valves 22 and 25.

An especially preferred application of the gas separator 100 of the invention and an application of the apparatus of the invention is in the supplying of natural gas, namely in the separating of natural gas from transported water. In such case, water, which at great depths (at high pressure) still carries dissolved natural gas, is conveyed by means of a pump from the bore opening. When it comes to the Earth's surface, the pressure sinks and the freed natural gas collects in bubbles in the flow. The bubbles lead to increased measurement inaccuracies in the measurement of flow. Furthermore, the natural gas would be given off into the atmosphere, when the water in the further process flow would come in contact with the atmosphere, a feature which is ecologically and economically undesirable. Therefore, it is exactly in the case of this application important to separate the natural gas reliably from the water, so that a sufficiently exact measuring is possible and no natural gas escapes into the atmosphere but, instead, in given cases, is captured in a pipe or pipeline for further transport.

An analytical estimation of the natural gas bubble size shows that very small bubbles must be separated (diameter <<1 mm). The bubble rise velocity depends, however, on their size: large bubbles rise faster than small. From this there results the fact that small bubbles require a longer dwell time for separation than large bubbles. Since the fluid mixture, however, in the known gas separators, is not at rest, but, instead, flows through these, this means that in the case of given flow velocity a separator in the construction of the state of the art must be longer, the smaller the bubbles to be separated are. A separator with large dimensions is, however, undesirable, since the costs of a separator increase with its size. A reduction of the structural length could basically be achieved by reducing flow velocity, introduced by expanding the flowed-through cross sectional area. This would, however, not get us to where we want to be, since the structural size then likewise increases.

For the sake of completeness, individual advantages of the constructive embodiment of the gas separator 100 and the apparatus for measuring the flow of at least one component of the multiphase medium will now be explained.

By creating the shallow water region 20 by use of the weir 5 flowed over by medium, especially liquid, in the gas separator 100 of the invention, the reduced water depth shortens the bubble rise time. Weir 5 is introduced into the housing of the separator therefore as a non-flowed through installation, in order to produce the shallow water region 20. Known separators utilize, in such case, perforated plates, which do not create a shallow water region.

The path, which a bubble must travel to the surface, is then shortened. In the case of given bubble rise velocity, thus the required dwell time is reduced.

Weir 5 is distinguished in a preferred embodiment by a perpendicular or very steep front surface 10. This can, however, in a less preferred embodiment rise to the guiding surface 11 as an inclined plane.

The front surface 10 provides an acceleration of the flow counter to the force of gravity. The inertial forces care for the fact that in the shallow water region 20 a starting velocity in a direction opposing the force of gravity is present. At the end of the shallow water region, the moderate slope of the ramp 12 means that the water can flow off undisturbed and a remixing of gas and water is prevented.

The separated gas is removed in the direction opposing the force of gravity.

Because of the funnel-shaped cross-sectional shrinking 17 of the gas drain tube 9, it is achieved that the gas, firstly, flows so slowly that the flow around drops possibly present in the gas occurs laminarly. Thus, the drops are essentially exposed to the force of gravity and experience only very small forces exerted by the leaving gas. The drops fall back into the separator and the gas flow remains free of water.

Practice has shown that fill level in the gas separator 100 of the invention can depend on the pressure- and flow boundary conditions in the intake and discharge. A decreased outflow can lead to the fact that the separator is flooded and, thus, water penetrates in undesired manner into the gasline. On the other hand, an increased outflow can completely empty the separator, so that gas enters into the water line. It has proved to be prudent to equip the separator with a fill level measurement. The fill level measurement can be implemented with one or two limit value switches or with a continuous measurement of the fill level (e.g. using pressure difference). From the fill height, signals are derived, which control the valves 22, 26 installed in the gas- and water-, or liquid, outlets.

When the fill height in the gas separator—actually or foreseeably—rises above a limit value, the valve 22 at the gas outlet is closed and reopened, when the limit value—actually or foreseeably—is subceeded. Likewise, the valve 26 at the water outlet is closed, when a second limit value—actually or foreseeably—is subceeded. This valve is reopened, when the second limit value—actually or foreseably—is exceeded.

The fill level measurement can preferably be implemented with an electronic pressure difference measuring device. This measures the absolute pressure at two positions and ascertains the pressure difference numerically. The absolute pressure can then be used e.g. to calculate density of the gas for a mass flow measurement.

Figure 3:
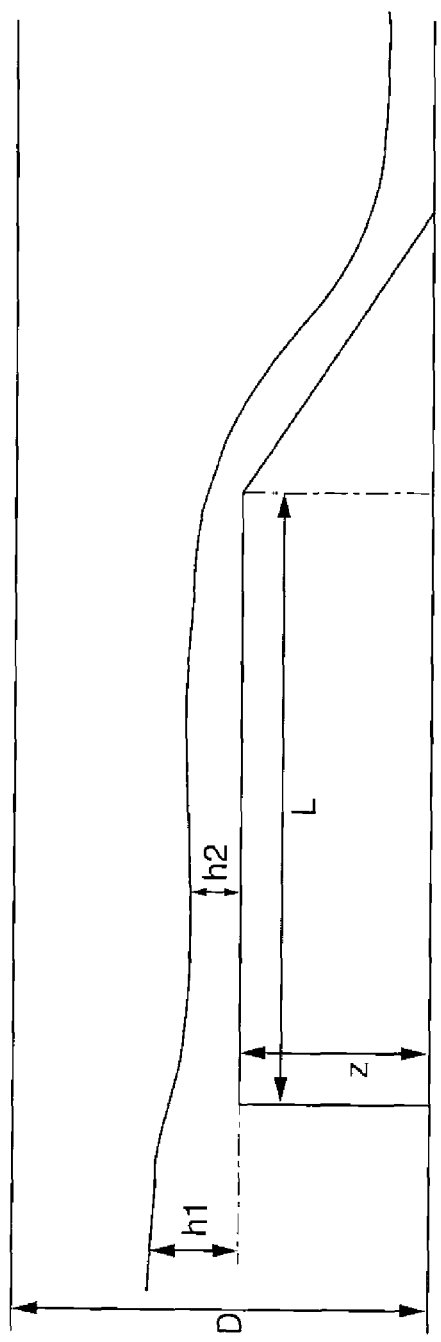
FIG. 3 shows a schematic view of the geometric embodiment of a weir arranged in the gas separator.

The geometric shape and operation of the weir 5 of FIGS. 1 and 2 will now be explained in greater detail based on FIG. 3 and based on the mixture, methane in water, as multiphase medium 3. A gas bubble with 10 micrometers diameter should be safely separated. (Larger bubbles rise faster. Consequently, the smallest bubble is considered as limiting case.)

A methane gas bubble has in water e.g. a rise velocity $u_9$ of 0.017 m/s. It must in the time t travel the height h2, in order to be able to escape from the water. In the same time t, the water flows with flow velocity $u_w$ over the weir (5) with the guiding surface of length L.

$$u_g = \frac{h2}{t}$$

$$u_w = \frac{L}{t}$$

$$u_w = u_g \cdot \frac{L}{h2}$$

The volume flow $\dot{v}$ equals flow velocity $u_w$ times the height h2 times the breadth D of the weir (The weir is thus as broad as the tube diameter.

$$\dot{v} = u_w \cdot h2 \cdot D$$

$$\dot{v} = u_g \cdot L \cdot D$$

In this way, the length L of the guiding surface (11) of the weir (5) in the flow direction becomes:

$$L = \frac{\dot{v}}{u_g \cdot D}$$

The heights, i.e. depths, h2 and h1 are known from hydraulics.

$$h1 = \left(\frac{3 \cdot \dot{v}}{2 \cdot \mu \cdot D \cdot \sqrt{g \cdot 2}}\right)^{\frac{3}{2}}$$

$$h2 = \frac{2}{3} \cdot h1$$

In such case, g is the acceleration of gravity (9.81 m/s^2) and p the discharge coefficient likewise known from hydraulics. For a weir of the here considered manner of construction, p assumes the value of 0.5. The height z of the weir should correspond, for instance, to half tube diameter. Ideally, $$z + h2 = \frac{D}{2}$$

Ideally, in such case, also $$z > h2$$

The invention claimed is:

1. A gas separator for separating a multiphase medium containing a gas and a liquid, including:
a tubular basic unit having a longitudinal axis, an intake for a gas containing medium, a liquid outlet and a gas outlet, wherein the tubular basic unit has an intake region and a discharge region; and
a weir positioned between the intake region and the discharge region, wherein the weir includes a guiding surface over which the gas containing medium can flow to form a shallow water region;
wherein the gas contained in the gas containing medium can escape from the gas containing medium in the shallow water region and be led away from the gas separator through the gas outlet;
wherein the weir has a ramp extending and retracting relative to the guiding surface in the direction of the discharge region.

2. The gas separator of claim 1, wherein the weir has a height along the guiding surface between about 60% and 120% of a perpendicular distance from the longitudinal axis to a bottom wall of the tubular basic unit.

3. The gas separator of claim 1, wherein the ramp has a slope between about 15 degrees and 45 degrees.

4. The gas separator of claim 1, further including a gas drain tube positioned between the gas outlet and the tubular basic unit, wherein the gas drain tube has a funnel-shaped cross section.

5. The gas separator of claim 4, wherein the gas drain tube has a portion with an average diameter of at least 75% of an average diameter of the tubular basic unit.

6. The gas separator of claim 4, further including a liquid drain tube positioned in the discharge region, wherein a vortex breaker is arranged in the discharge region and/or in the liquid drain tube.

7. The gas separator of claim 6, wherein a cutting plane along the longitudinal axis divides the gas separator into a top part and a bottom part, wherein an intake tube for supplying the gas containing medium into the tubular basic unit and the liquid drain tube for draining the liquid from the tubular basic unit are arranged on the bottom part of the tubular basic unit and wherein the gas drain tube is arranged on the top part of the tubular basic unit.

8. The gas separator of claim as claimed in claim 7, wherein the intake tube is a riser tube.

9. The gas separator of claim 1, wherein a lengthwise extension of the guiding surface of the weir is greater than an average diameter of the tubular basic unit.

10. An apparatus for registering flow of at least one component of a multiphase medium containing at least one gas and a liquid, including:
a tubular basic unit having a longitudinal axis, an intake for a gas containing medium, a liquid outlet and a gas outlet, wherein the tubular basic unit has an intake region and a discharge region;
a weir positioned between the intake region and the discharge region, wherein the weir includes a guiding surface over which the gas containing medium can flow to form a shallow water region;
wherein the gas contained in the gas containing medium can escape from the gas containing medium in the shallow water region and be led away from the gas separator through the gas outlet;
at least one flow measuring device configured for registering the flow of the gas and/or the liquid, wherein the at least one flow measuring device is arranged fluid mechanically in a direction of the gas flow or the liquid flow behind the tubular basic unit; and
a valve for controlling gas flow at the gas outlet and a valve for controlling liquid flow at the liquid outlet, wherein both valves are controllable valves, wherein the controllable valves controlled based on a control variable, wherein the control variable is a limit value corresponding to a depth in the discharge region or in the shallow water region.

11. The apparatus of claim 10, further including a flow measuring device positioned in a liquid drain tube, wherein the liquid drain tube is a magneto inductive flow measuring device, a vortex flow measuring device, a Coriolis flow measuring device or an ultrasonic flow measuring device.

12. The apparatus of claim 10, further including a flow measuring device positioned in a gas drain tube, wherein the flow measuring device is a thermal, flow measuring device, a vortex flow measuring device or an ultrasonic, flow measuring device.

13. The apparatus of claim 10, further including a valve for controlling gas flow at the gas outlet.

14. The apparatus of claim 10, further including a valve for controlling liquid flow at the liquid outlet.

15. A gas separator for separating a multiphase medium containing a gas and a liquid, including:
- a tubular basic unit having a longitudinal axis, an intake for a gas containing medium, a liquid outlet and a gas outlet, wherein the tubular basic unit has an intake region and a discharge region; and
- weir positioned between the intake region and the discharge region, wherein the weir includes a guiding surface over which the gas containing medium can flow to form a shallow water region;
- wherein the gas contained in the gas containing medium can escape from the gas containing medium in the shallow water region and be led away from the gas separator through the gas outlet;
- wherein a cutting plane along the longitudinal axis divides the gas separator into a top part and a bottom part, wherein an intake tube for supplying the gas containing medium into the tubular basic unit and the liquid drain tube for draining the liquid from the tubular basic unit are arranged on the bottom part of the tubular basic unit and wherein the gas drain tube is arranged on the top part of the tubular basic unit.

* * * * *